Jan. 22, 1946.  H. K. RICHARDSON ET AL  2,393,265
METHOD AND APPARATUS FOR MOLDING GLASS ARTICLES
Filed April 30, 1938  7 Sheets-Sheet 1
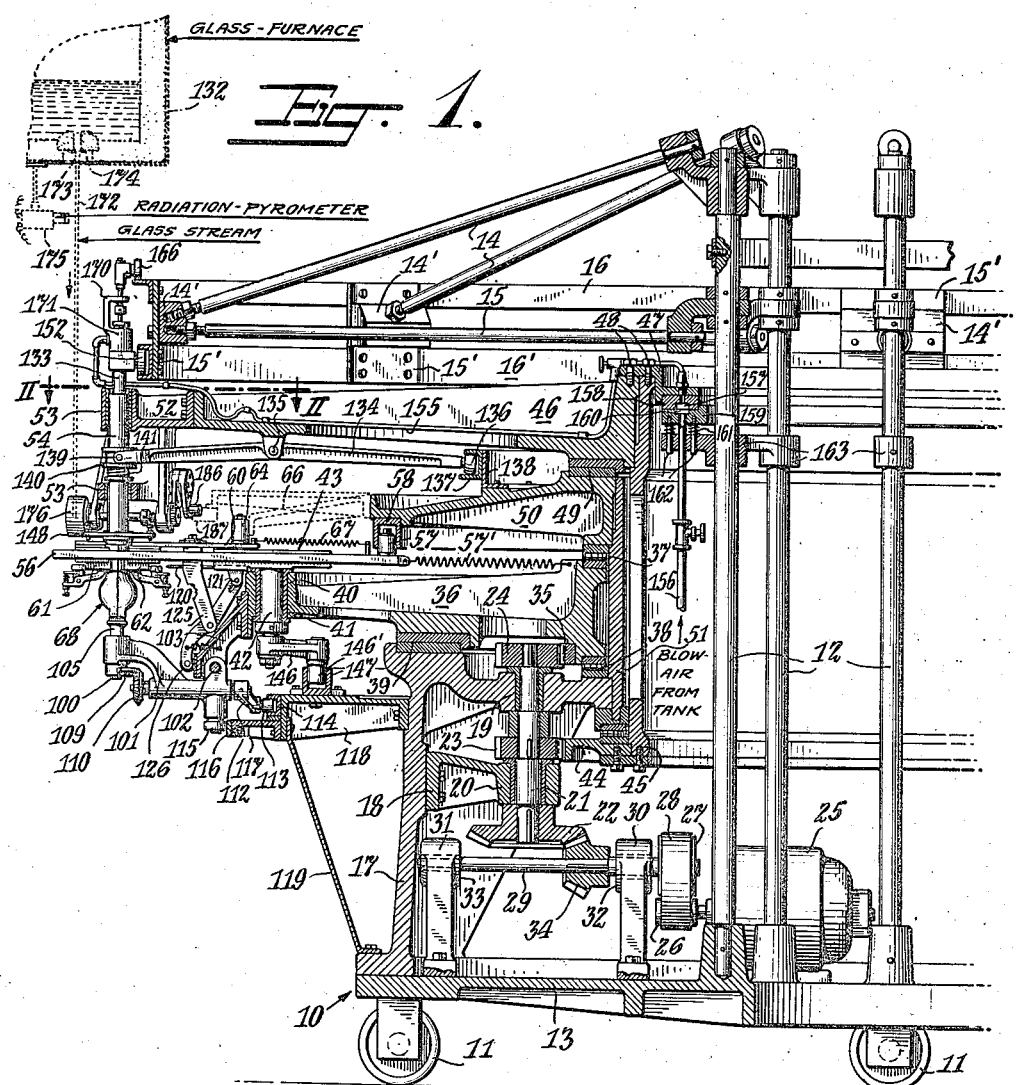
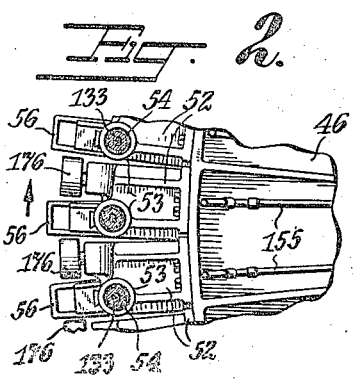
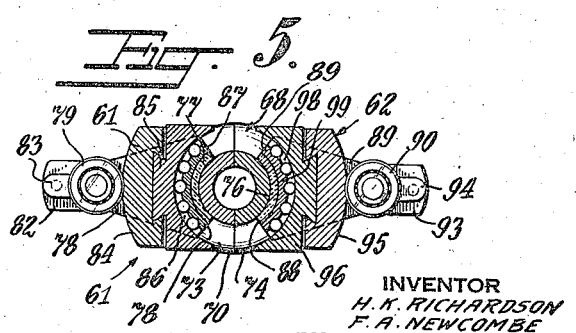
INVENTOR
H. K. RICHARDSON
F. A. NEWCOMBE
A. H. LAIDIG
BY
ATTORNEY

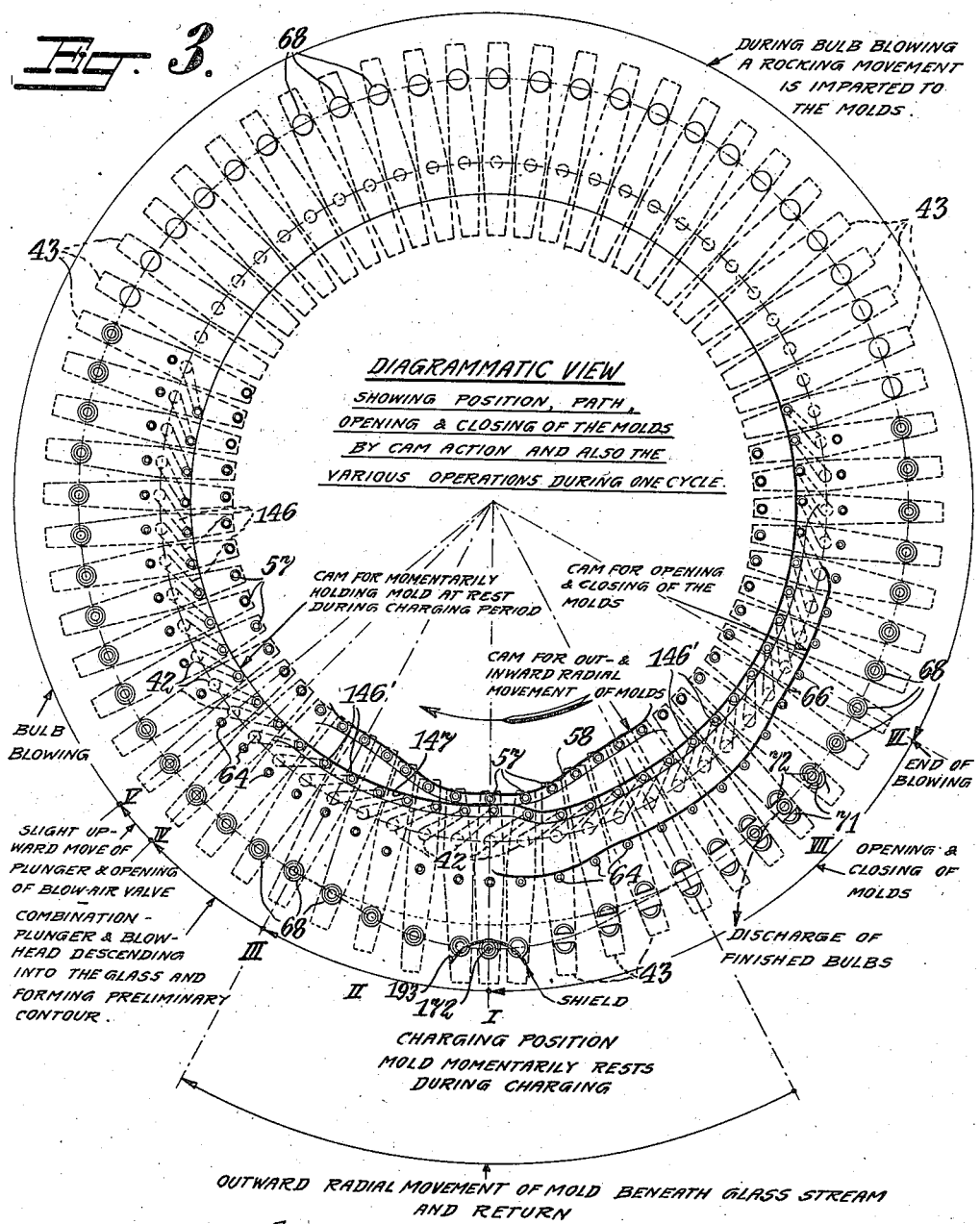

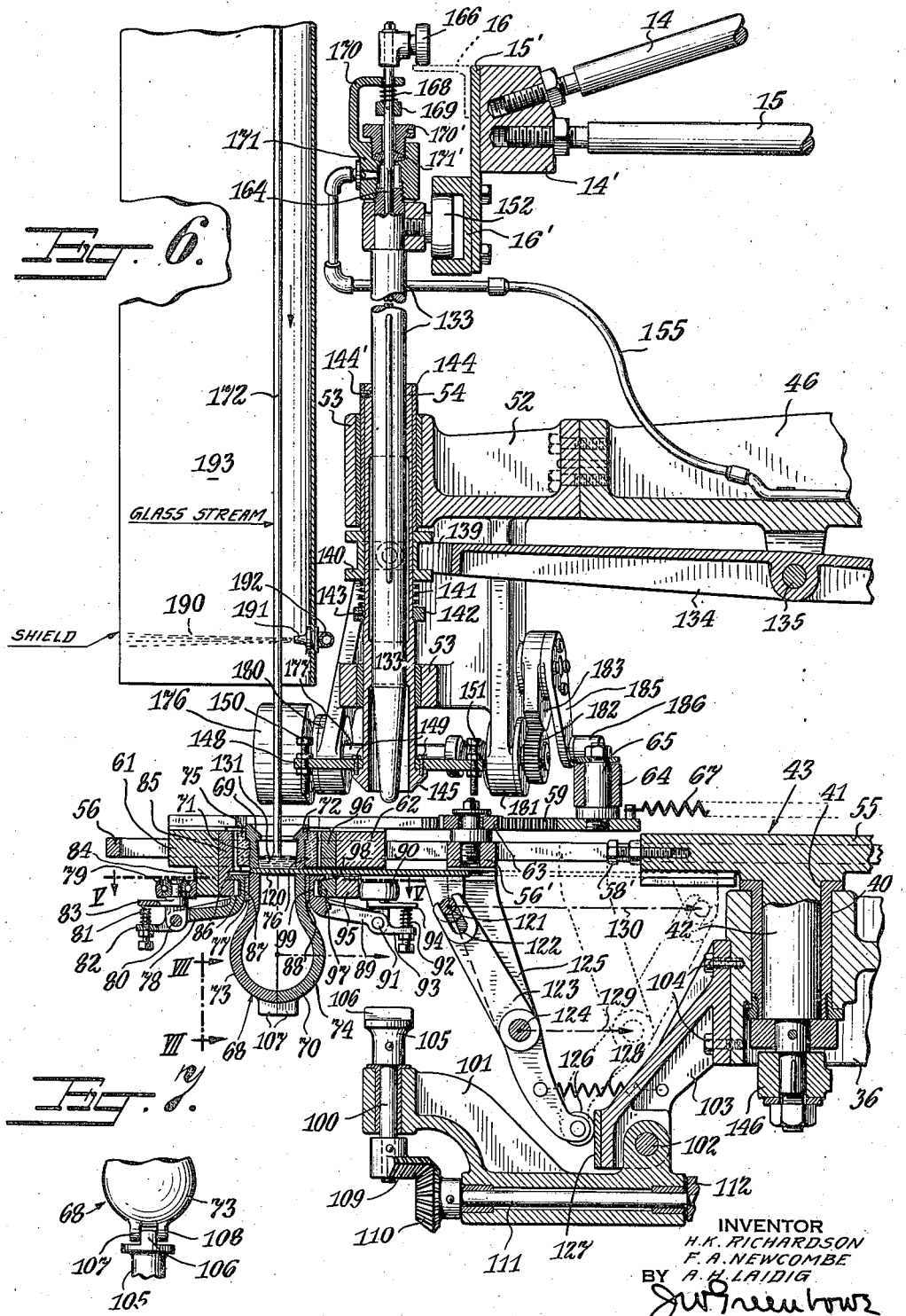

Jan. 22, 1946.  H. K. RICHARDSON ET AL  2,393,265
METHOD AND APPARATUS FOR MOLDING GLASS ARTICLES
Filed April 30, 1938  7 Sheets-Sheet 4

INVENTOR
H. K. RICHARDSON
F. A. NEWCOMBE
A. H. LAIDIG
BY
ATTORNEY

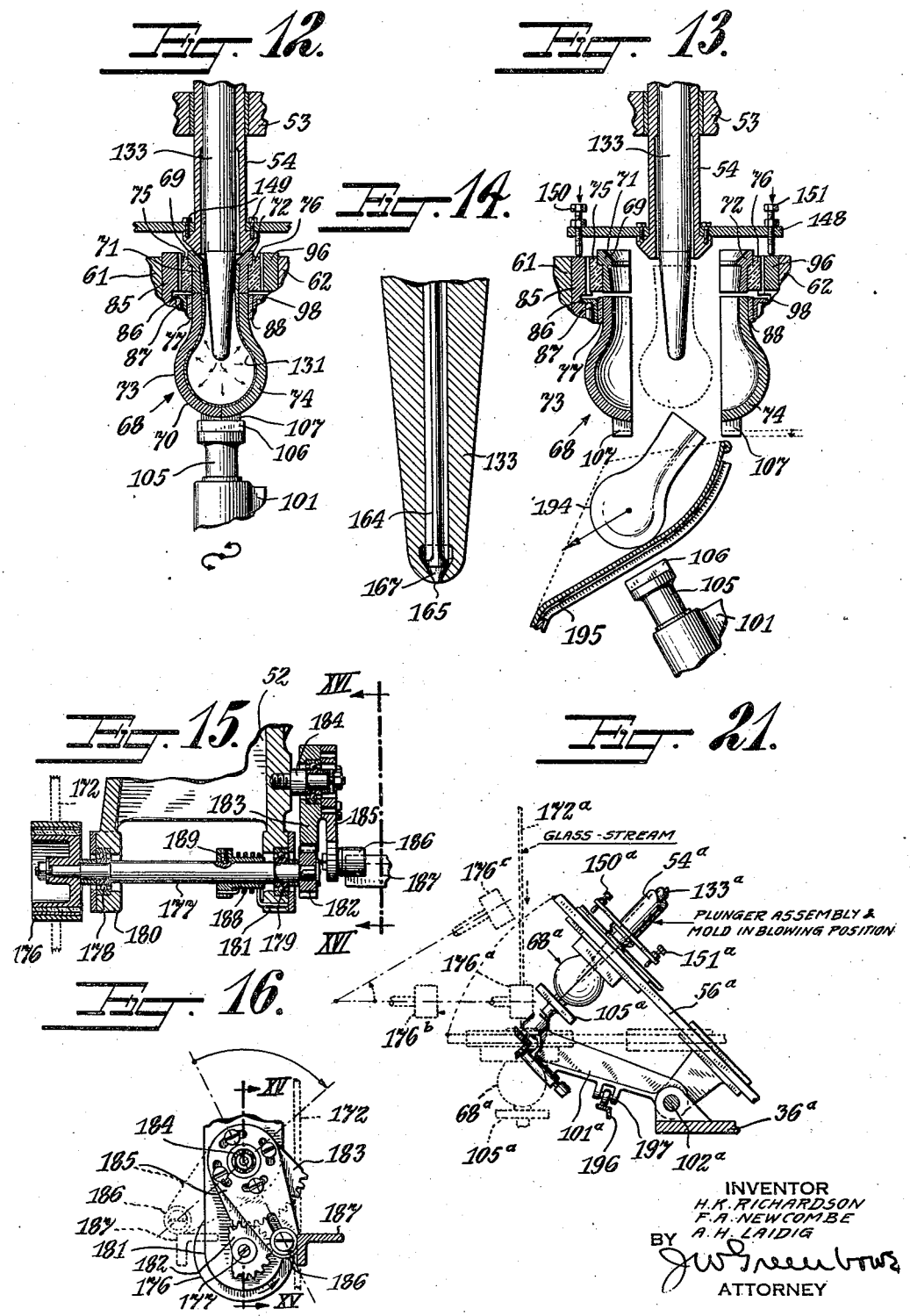

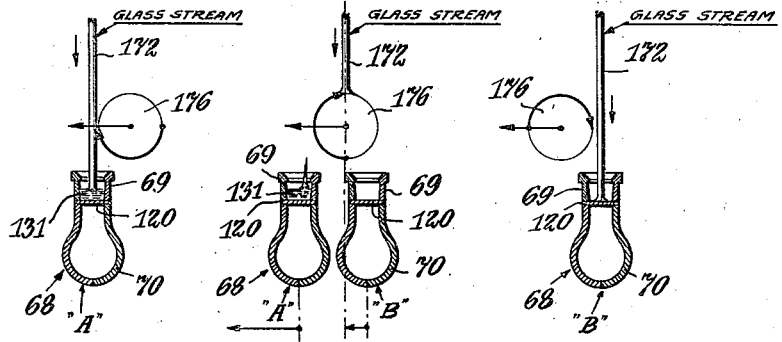
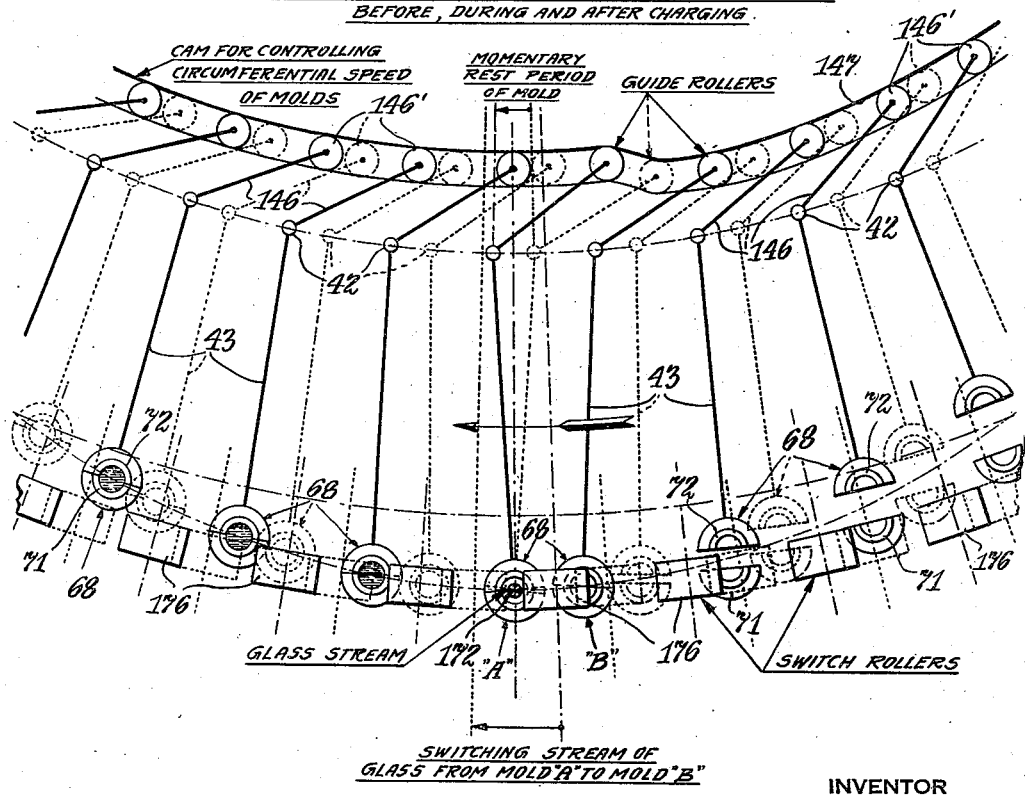

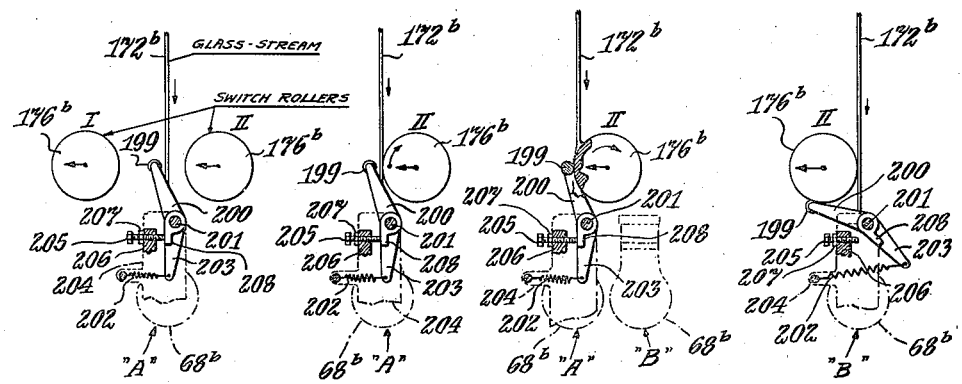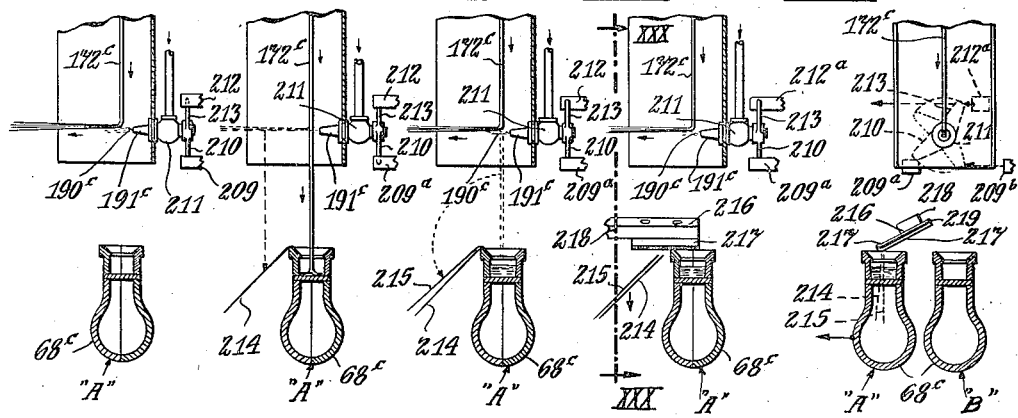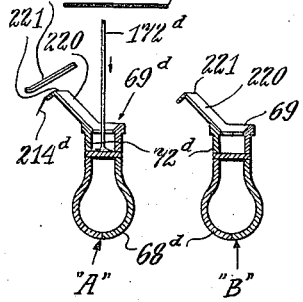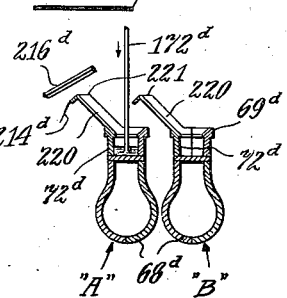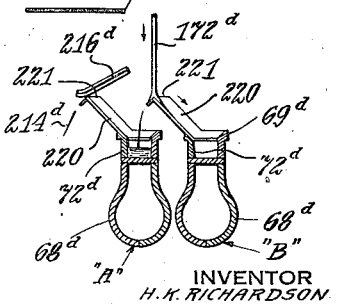

Patented Jan. 22, 1946

2,393,265

UNITED STATES PATENT OFFICE 2,393,265

METHOD AND APPARATUS FOR MOLDING GLASS ARTICLES

Henry K. Richardson, Bloomfield, Frank A. Newcombe, Nutley, and Alfred H. Laidig, Bloomfield, N. J., assignors to Westinghouse Electric Corporation, East Pittsburgh, Pa., a corporation of Pennsylvania Application April 30, 1938, Serial No. 205,180

23 Claims. (Cl. 49—5)

This invention relates to an improved method and apparatus for molding glass articles, and particularly bulbs for incandescent electric lamps.

The principal object of our invention, generally considered, is the manufacture, without cullet or moil, of thin-walled glass articles, such as bulbs for incandescent electric lamps, by the provision of an improved method and apparatus, feeding molds from a stream of freely-flowing molten glass and thereby eliminating the mold shear marks.

Another object of our invention is an improvement in the method of manufacturing glass articles involving the steps of filling the top portion of a mold with glass delivered in a stream from a glass melting furnace, terminating the flow of glass from said stream into said mold, allowing the glass received in said top portion to sag toward the bottom portion of said mold, bringing the bottom portion of said mold into engagement with said top portion, forcing a forming plunger into the mass of glass in said top portion, blowing said glass to the desired size by means of compressed air, while oscillating said mold bottom portion to avoid the formation of seams or ridges, and opening said mold to allow said article to drop therefrom.

A further object of our invention is the provision of apparatus for manufacturing glass articles comprising a mold formed as a top portion and a bottom portion, both portions being divided and the parts laterally movable toward and away from one another, means for moistening said mold, a separator element movable between the top and bottom portions of said mold, means for feeding glass to the top portion of said mold, so that it is held on said separator element, means for intercepting the flow of glass from said feeding means when the desired amount has been placed in the top portion of said mold, means for removing said separator element from below said mass of glass and moving the bottom portion of said mold into engagement with said top portion, a plunger insertable in said mass of glass for forcing it into the lower portion of said mold, means for supplying air to said plunger for blowing said glass to the desired size in said mold, and means for separating the parts of said upper and lower portions of said mold in order to allow the molded article to drop therefrom.

Other objects and advantages of the invention, relating to the particular arrangement and construction of the various parts, will become apparent as the description proceeds.

Referring to the drawings illustrating our invention,

Fig. 1 is a vertical sectional view of a machine for molding glass articles, together with a fragmentary portion of an associated glass furnace.

Fig. 2 is a fragmentary horizontal sectional view on the line II—II of Fig. 1, in the direction of the arrows.

Fig. 3 is a diagrammatic plan of the mold-holding portions of said apparatus, showing the path that the molds travel during operation of the machine.

Fig. 4 is an enlarged plan of one of the mold carriers or carrying devices.

Fig. 5 is a horizontal sectional view on the line V—V of Fig. 6, showing details of the mold-holding portion of a carrier.

Fig. 6 is an enlarged fragmentary view, corresponding to the left-hand portion of Fig. 1, but showing the relative positions of the parts during the time a mold is being filled with glass from a furnace, or is in a location as designated by the reference character I in Fig. 3.

Fig. 7 is a fragmentary elevational view of a portion of a mold and oscillating mechanism therefor, on the line VII—VII of Fig. 6, in the direction of the arrows.

Fig. 12 is a view corresponding to Fig. 8, but showing the relative positions of the parts when the mold has reached the location designated by the reference character VI in Fig. 3, the glass article being then expanded to the fullest extent by compressed air.

Fig. 13 is a view corresponding to Fig. 8, but showing the relative positions of the parts when the mold has reached the location designated by the reference character VII in Fig. 3, the mold being then open and the glass article or bulb discharged therefrom.

Fig. 14 is an enlarged fragmentary vertical sectional view of the lower portion of the plunger, showing the valve which normally closes the lower end thereof.

Fig. 15 is a detailed vertical sectional view of the glass-stream switching mechanism, on the line XV—XV of Fig. 16 in the direction of the arrows.

Fig. 16 is an elevational view of the glass-stream switching mechanism, on the line XVI—XVI of Fig. 15, in the direction of the arrows.

Fig. 17 is a diagrammatic view showing a switch roller as it is about to strike the glass stream, for cutting off the glass from one mold and delivering it to the next.

Fig. 18 is a view corresponding to Fig. 17, but showing the next position when the stream is in the course of transfer from one mold to another.

Fig. 19 is a view corresponding to Fig. 17, but showing the relative positions of the parts when the glass stream has actually been transferred to another mold.

Fig. 20 is an enlarged diagrammatic fragmentary view corresponding to Fig. 3, but showing the relative positions of the molds and switch rollers adjacent and on both sides of the mold-filling position.

Fig. 21 is a fragmentary view corresponding to Fig. 10, but showing another embodiment of our invention.

Fig. 22 is a view corresponding to Fig. 17, but showing switch rollers in the position in which one is approaching the glass stream to be severed, and a cutting roller is employed therewith, in accordance with a further embodiment of our invention, for avoiding the formation of "strings."

Fig. 23 is a view corresponding to Fig. 22, but showing the next position when a switch roller has approached the glass stream just before severance thereof.

Fig. 24 is a view corresponding to Fig. 23, but showing the position of the parts as the glass stream is being severed.

Fig. 25 is a view corresponding to Fig. 24, but showing the position of the parts while the switch roller is passing over the cutting roller, after it has passed under the glass stream and transferred it from one mold to the next.

Fig. 26 is a fragmentary view corresponding to Fig. 6, but showing an air jet in operation for removing the stream of molten glass and arresting its flow into a mold, in accordance with still another embodiment of our invention.

Fig. 27 is a view corresponding to Fig. 26, but showing the air cut off in order to allow the glass stream to flow into the mold.

Fig. 28 is a view corresponding to Fig. 27, but showing the glass stream blown away after the mold has been filled.

Fig. 29 is a view corresponding to Fig. 28, but showing the position of the parts during the removal of the glass strings.

Fig. 30 is a sectional view on the line XXX—XXX of Fig. 29, in the direction of the arrows.

Fig. 31 is a view of adjacent molds, corresponding to Fig. 17, but illustrating a still further embodiment of our invention.

Fig. 32 is a view corresponding to Fig. 31, but illustrating the next position of the molds when the glass stream is about to be severed during transfer from one mold to the next.

Fig. 33 is a view corresponding to Fig. 32, but showing the position of the parts when the filling of one mold is being terminated and molten glass has started to flow into the adjacent mold.

Figure 8:
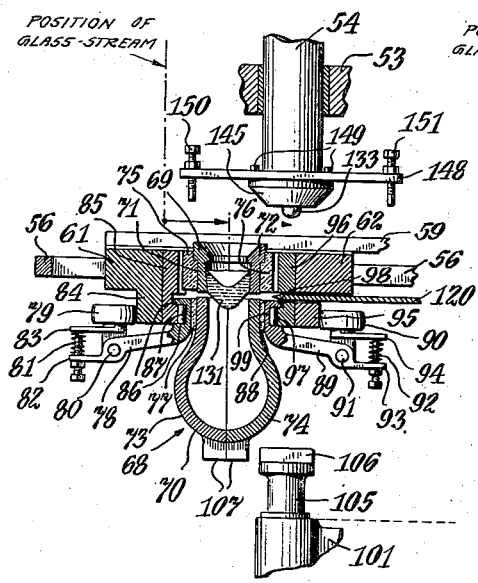
Fig. 8 is a fragmentary view of a mold and associated parts, corresponding to Fig. 6, but showing the relative positions of said parts when the mold has reached the location designated by the reference character II in Fig. 3.

*Embodiment of Figs. 1 to 20 inclusive*

Referring to the drawings in detail, like parts being designated by like reference characters, and first considering the embodiment of our invention illustrated in Figs. 1 to 20, inclusive, there is shown a frame 10 which may be mounted on rollers 11, in order to be conveniently moved. The frame carries a number of vertical standards or posts 12 extending from the base plate 13 thereof and from the upper portions of which extend braces, those designated 14 extending downwardly and outwardly, and those designated 15 extending horizontally and radially, with their ends connected by blocks 14', attached to bracing plates 15' of the circular frame, formed of cam elements 16 and 16' which will be referred to later.

The frame 10 also carries a generally cylindrical or slightly frusto-conical casting 17, which in turn carries bearing casting 18, respectively provided with bearings 19 and 20 in which is mounted a shaft 21. The shaft 21 has a bevel gear 22 at its lower end, a spur gear 23 intermediate its ends, and a spur gear 24 at its upper end, all of said gears being keyed to the shaft, and said spur gears serving to drive rotatable parts of the machine, as will be subsequently described.

The shaft 21 is driven from a source of power, such as an electric motor 25, mounted on the base 13 of the frame 10, through pulleys 26 and 27 and connecting belt 28, said pulley 27 being mounted on a jack shaft 29 supported by brackets 30 and 31, also mounted on the base plate 13, and carrying bearings 32 and 33. The shaft 29 carries a bevel gear 34 keyed thereto and meshing with the gear 22 for driving the shaft 21.

The spur gear 24 meshes with teeth 35 on a mold carrier spider 36 for driving the same about the vertical axis of the frame 10. This spider 36 preferably comprises an anular casting rotatable on bearings 37, 38 and 39, and provided adjacent its circumference with apertures 40 carrying bushings or bearing members 41 in which are rotatably mounted stub shafts 42 extending downwardly from the mold carriers 43. A crank arm 146 is secured to the lower end of each shaft 42 and carries a roller 146' traveling in a cam track 147, carried by the shelf casting 118 for causing the mold carriers to angle as they revolve about the axis of the spider 36 as illustrated in Figs. 3 and 20.

The spur gear 23 engages teeth of an annular gear 44 mounted on the lower portion of a hollow cylindrical driving member 45 for the plunger-carrying plate 46, to the inner peripheral portion of which it is fastened, as by means of connecting and bearing-carrying casting 47 and screws 48. The plate 46 is rotatably mounted on a bearing 49, supported on an annular plate 50, which latter is mounted on a generally cylindrical member 51 extending from the casting 17. The peripheral portion of the plate 46 carries a series of castings 52, each provided with bearings 53 for one of the plunger housings 54.

Each mold carrier 43, the series of which is shown in outline in Fig. 3, is in accordance with the detailed showing of Fig. 4, and comprises a block 55 mounted on the top of a corresponding stub shaft 42, and on which its mold carrier frame 56 is slidable. Each frame 56 carries a cam roller 57 normally guided in the groove of a cam 58 which is carried by the annular plate member 50, as most clearly shown in Fig. 1. Slidably mounted on each mold carrier frame 56 are rack bars 59 and 60, the former connected to the outer mold carrier device 61 and the latter connected to the inner mold carrier device 62. An idler gear 63, pivoted on a cross member 56' of each frame 56 between said rack bars 59 and 60, serves to operatively tie said bars together for movement in opposite directions, when the rack bar 59 is moved by engagement of its roller 64, which is mounted on a vertical pivot 65 extending therefrom, with mold-opening cam 66, as shown most clearly in Figs. 1 and 3. A coil spring 67 connects each frame 56 with its rack member 59 for holding the roller 64 against its cam 66, thereby keeping the mold members closed, except when positively actuated by the opening and closing cam 66. A spring 57', connecting each frame 56 with the spider 36, keeps the frames in retracted positions, with their cross members 56' engaging adjustable stop devices 58' extending from the blocks 55, except when positively actuated by the cam 58.

Each mold 68, as shown most clearly in Figs. 4, 5, 6, and 7, comprises a top or upper portion 69 and a bottom or lower portion 70, all formed of metal, such as iron. Each top portion 69 is in turn divided on an axial plane into an outer portion 71, and an inner portion 72, and each lower or bottom portion 70 is likewise divided on an axial plane into an outer portion 73 and an inner portion 74. When used for the manufacture of lamp bulbs, the mold portions are desirably cork lined or coated on the inside with a paste made of cork and shellac, about 1/64 of an inch thick.

The upper outer portion 71 of each mold 68 is held in its outer mold carrying device 61 by a preferably heat-insulating bushing section 75, while the upper inner portion 72 of each mold 68 is held in its inner mold carrying device 62 by a preferably heat-insulating bushing section 76, as shown in Figs. 4 and 6.

Provision is made for oscillating the lower sections 73 and 74 of each mold and for this purpose each lower outer section 73 is held by a preferably heat-insulating bushing section 77 mounted on a roller bearing device 78, pivoted to a ball bearing device 79, as indicated at 80. A spring 81 serves to engage arms 82 and 83 on each of the devices 78 and 79, in order that each depending annular collar section 84, of the outer mold carrying devices 61, and the sliding element 85, dovetailed with respect thereto, as illustrated in Fig. 5, may be gripped between the corresponding roller and ball bearing devices 78 and 79, with an inwardly extending shoulder portion of 86 disposed between the sides 86 of the roller bearing raceway 87 of the corresponding device 78, in order to hold the associated mold portion 73 at the desired elevation.

In the same way, each lower inner section 74 is held by a preferably heat insulating bushing section 88, mounted on a roller bearing device 89, pivoted to a ball bearing device 90, as indicated at 91. A spring 92 serves to engage arms 93 and 94 on the devices 89 and 90, in order that the depending annular collar section 95 and associated sliding element 96, dovetailed with respect thereto, as illustrated in Fig. 5, may be gripped between the roller and ball bearing devices 89 and 90, with the inwardly extending shoulder portion 97 disposed between the sides 98 of the roller bearing raceway 99 of the device 89, in order to hold the associated mold portion 74 at the desired elevation, corresponding with that of the mold portion 73.

The means for oscillating the lower portions 70 of the molds during the molding operation comprises shafts 100 which normally extend vertically, are rockably mounted in carrier devices 101, pivoted at 102 to a cam-carrying member 103 secured to the peripheral portion of the mold-carrying spider 36, as by means of bolts 104. Each shaft 100 carries at its upper end a head 105, from which extends a flange or lug 106 adapted to fit between flanges 107 and 108 depending from the corresponding lower mold sections 73 and 74, as indicated in Figs. 1, 7, 9, 10, and 11, for the purpose of imparting oscillatory motion thereto, without preventing movement of said sections toward and away from one another. Each head 105 is so positioned that when the corresponding mold carrier is drawn inwardly by means of the cam 58, as from the position illustrated in Fig. 6, to that of Fig. 9, its depending flanges 107 and 108 straddle the upstanding flange 106, thereby interlocking the head 105 with the mold sections 73 and 74 for transmitting the desired oscillatory motion to the latter.

For imparting oscillatory motion to each head 105, we provide bevel gear segments 109, secured to the lower ends of the shafts 100, and meshing with bevel gears 110, secured to normally horizontal shafts 111, rotatably mounted in carrier devices 101, and each carrying at its inner end a crank arm 112, provided with a roller 113 travelling in a cam track 114, which is serpentine in side elevation in order to provide the desired oscillatory motion to said crank, which motion is in turn transmitted to the corresponding head 105.

Each carrier 101 is also provided with a roller 115 engaging a cam 116 carried by a casting 117, secured to a shelf casting 118, extending from the casting 17, and rigidified with respect thereto by diagonally extending braces 119. The cam 116 is of such formation that it causes each carrier 101 to rise, when it reaches the desired phase of its motion, about its pivot 102 and raise the engaged lower mold elements 73 and 74 into contact with the corresponding upper mold elements 71 and 72, or from the position shown in Fig. 8 to that of Fig. 9.

The upper mold sections 71 and 72 of each mold 68 are initially separated from the corresponding lower mold sections 73 and 74 by a horizontally sliding plate 120 provided with a lug 121 secured to its lower surface, and received in a notch 122 in the upper end of a lever 123, pivoted at 124 to a bracket 125 depending from the corresponding mold carrier 56. The lower end of each lever 123 carries a roller 126, held in engagement with an associated cam 127 by means of a coil spring 128, so that when its mold carrier 56 is moved inward from the position illustrated in Fig. 6, to that illustrated in Fig. 9, the pivot 124 of the lever 123 is moved a distance corresponding with the length of the arrow 129, while the lug 121 and slidable plate 120 are moved a greater distance, corresponding with the length of the arrow 130, so that the plate 120 is withdrawn from the position between the upper and lower portions of its mold 68, allowing the lower portions 73 and 74 to be moved into engagement with the corresponding upper portions 71 and 72.

In order to provide for blowing the mass of glass 131 in each mold, after reception thereof from an associated glass furnace 132, we provide a plunger 133 for each mold, each plunger being slidably movable in a corresponding plunger housing or sleeve 54, which is independently operable by a lever 134 pivoted to the carrying plate 46 at 135, and carrying a roller 136 at its inner end, movable in a cam track 137 carried by an angle iron 138, in turn mounted on the annular plate 50. The outer end of each lever 134 is forked as indicated at 139, and embraces a sleeve 140 slidable on the plunger housing 54, for resiliently acting thereon through a coil spring 141, disposed between said sleeve and an annular member 142, connected to the plunger housing 54 as by means of a set screw 143. Each sleeve 140 normally abuts against a bushing 144, secured on the plunger housing 54 in any desired manner, as by set screw means 144', thereby holding its housing in elevated position, as shown most clearly in Fig. 6.

Figure 10:
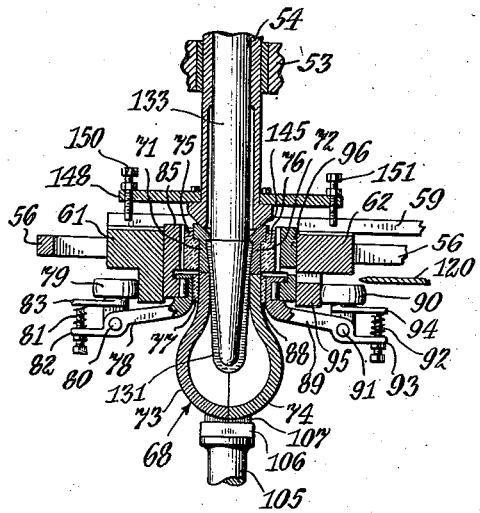
Fig. 10 is a view corresponding to Fig. 8, but showing the relative positions of the parts when the mold has reached the location designated by the reference character IV in Fig. 3, the plunger being depressed into the mass of glass.

The lower portion of each housing 54 is beveled, as indicated at 145, to fit the correspondingly flared upper end portion of the corresponding mold 68, when it is lowered thereinto, as shown most clearly in Fig. 10, thereby providing for accurately centering said housing and the associated plunger 133 with respect to its mold.

The lower portion of each housing 54 carries means for pushing down the corresponding sliding elements 85 and 86, when the mold sections are separated as shown in Fig. 13, in order to thereby lower the associated bottom mold sections 73 and 74 to the position there shown, where the sliding plate 120, shown in Fig. 6, may be reinserted to provide a glass receiving pocket in the upper portion 69 of the mold 68. For this purpose, a plate 148 is secured to each plunger housing 54, as by tap bolts 149, and at its outer ends provided with bolts 150 and 151 adjustably mounted therein and with their lower ends spaced the proper distance to cooperate with said sliding elements 85 and 96, as shown in Fig. 13, and push them back to lowered position for the purpose previously mentioned.

Each plunger 133 carries a roller 152 mounted near its upper end and traveling in the track formed by the channel-shaped cam member 16', which is braced by the members 15', 16, 14', 14 and 15, previously mentioned, whereby said plunger is moved up and down with respect to the mold 68, as desired.

In order to blow glass articles in the molds 68, compressed air is introduced to the plungers 133 by pipes 155, which connect with an air supply line 156 through ports 157 in a block 158, sliding on a block 159 formed with a registering port or groove 160. The block 159 is resiliently pressed against the rotating block 158, carried by connecting member 47, by springs 161 surrounding studs 162, fixed to the block 159 and slidable in supporting brackets 163 secured to posts 12 as shown in Fig. 1.

Compressed air passes to the lower portion or tip of each plunger 133 along a fluted or ribbed valve stem 164, shown in detail in Fig. 14, passing out of the valve opening 165 when the stem 164 is raised with respect to the plunger 133, as by means of cam 16 acting on roller 166 carried by the upper end of said valve stem. Each valve 167 is kept closed, as shown in Fig. 14, by a coil spring 168 acting between a collar 169 secured to the upper portion of the stem and a stop 170 extending from the head 171 which receives compressed air from pipe 155, and is closed by nut 170' and packing 171'.

Molten glass is desirably supplied to the molds, one by one, by means of a stream 172 flowing freely from the glass melting furnace 132 through an orifice 173 provided by a die 174, which die is preferably formed of an alloy of platinum and rhodium, such as described and claimed in the application of Henry K. Richardson, Serial No. 18,983, filed April 30, 1935, replaced by his application Serial No. 227,170, filed August 27, 1938, now Patent No. 2,190,296, dated February 13, 1940, and owned by the assignee of the present application and Baker & Co., Inc.

The temperature of said stream is desirably maintained uniform by sighting a radiation pyrometer 175 thereon and controlling the heat of the furnace by means of apparatus such as described and claimed in the Richardson application Serial No. 759,444, filed December 28, 1934, now Patent No. 2,116,450, dated May 3, 1938, so that an accurately controlled amount of glass is fed to each mold as it passes under the stream 172 issuing from said furnace.

In order to cut off the glass when the desired amount has been placed in a mold, without leaving a string, and transfer the stream 172 to the adjacent mold without waste, we employ rollers 176, one associated with each plunger 133, so that at the proper time the corresponding roller will cut the glass stream, thereby terminating the filling of one mold, and transfer said stream to the adjacent mold.

This operation is illustrated diagrammatically in Figs. 17 to 20 inclusive, Figs. 17 and 20 representing the position of a roller 176 and the associated mold 68, when the roller is just starting to sever the glass stream 172, Fig. 18 representing the subsequent position where the glass stream 172 has been severed and carried over by the roller preparatory to letting it drop into adjacent mold 68 in position "B," and Fig. 19 representing the final position where the glass stream 172 has been actually shifted from the mold in position "A" to that in position "B."

The means for shifting each roller 176 so that it cuts off the glass stream at the desired point and transfers it from one mold to the next, is illustrated in Figs. 1, 6, 15, and 16. Each roller 176 is mounted on a shaft 177, desirably carried by ball bearings 178 and 179, in arms 180 and 181 extending downward from one of the castings 52. On the inner end of each shaft 177 is mounted a spur gear 182, meshing with a spur gear segment 183, carried by roller bearings on a stub shaft 184 extending from the casting 52. Secured to said gear segment 183 is a crank arm 185 carrying a roller 186, which is intermittently actuated by engagement with a cam 187 mounted on the frame of the machine, as the rollers 176 are carried around with the mold during operation of the machine.

The engagement of the cam 187 with a roller 186 occurs when it is desired to twirl that roller, so that its peripheral speed is greater than the speed of the glass stream, at the time the actual cut off of the glass occurs. After cutting off, the roller passes off the cam 187 and is restored to its initial position by its spring 188 acting between a bushing 189 secured thereto and the associated arm 181.

Operation of embodiment of Figs. 1 to 20, inclusive

From the foregoing description of the elements of the machine, it will be seen that we have provided for the filling of a series of molds in order, the cutting of the stream of glass to one mold and the transferring of said stream to the next, the removal of the separator element between the upper and lower portions of the filled mold, the bringing of the lower portion of said mold up to the top portion, the forcing of a forming plunger into a mass of glass, the blowing up of the glass article or bulb by compressed air, and the opening of the mold and discharge of the article.

The detailed operation involves first, the filling of a mold 68 from the stream 172 of glass at a high temperature where it flows freely when the parts are positioned as shown in Fig. 6. See article by H. K. Richardson entitled "Flow of glass through tubular orifices," beginning on p. 239, vol. 17, No. 8, "Journal of the American Ceramic Society," August 1934. Although associated roller 176 serves for cutting off the glass stream during normal operation, yet if for any reason it is desired to remove the glass stream while the machine is stopped, without shutting off the glass melting furnace, said stream may be blown away by the jet or stream 190 of compressed air issuing from a nozzle or tip 191, supplied by pipe 192 supported on shield 193.

When the desired amount of glass 131 has been applied to the mold above the sliding plate 120, as shown in Fig. 6, rotation of the mold carrying spider 36 carries the particular mold under consideration from the position designated as I in Fig. 3, to that designated as II, the associated parts being then disposed as shown in Fig. 8. During this movement, the mold 68 is drawn inwardly on account of the formation of the cam 58, and at the same time said mold is moved angularly by the roller 146' travelling in its cam track 147.

This angular movement, superimposed on the rotary or circumferential movement of the mold carrier 56, is what causes the mold 68 to move at a faster rate than the corresponding roller 176, after the glass stream 172 has been cut therefrom, as indicated in Figs. 17 to 20, inclusive. In other words, the angular movement of the mold carrier, induced by the cam track 147, first causes a speeding-up and then a slowing up of the resultant movement of the mold 68, as it approaches the filling position I, so that it is overrun by the associated glass switch roller 176, and the glass stream 172 cut off and transferred to the following mold. After this the mold moves faster, as the angular movement is then augmenting its circumferential speed, as shown by the increase in angular distances between the mold carrier on the radius II in Fig. 3 and the adjacent molds, as compared with that on the radius I and its adjacent molds. Therefore, each mold hesitates or momentarily stops as it reaches the position I in Fig. 3, where the glass stream pours into the upper part 69 of said mold, above the plate 120, until it is cut off and transferred to the succeeding mold, after which the first mold speeds up, and is traveling at practically normal circumferential speed by the time it reaches the position II in Fig. 3, although in this position it is still moving inward along a radius.

During its inward radial movement, from the position I to position II, the sliding plate 120, as shown in Fig. 6, moves at a speed represented by the arrow 130, as compared with the mold speed represented by the arrow 129, so that it is withdrawn from between the upper mold sections 69 and the lower mold sections 70, allowing the mass of glass 131 to sag, as shown in Fig. 8.

From the time of deposit of the glass in the upper portion 69 of the mold, until the plate 120 is wtihdrawn, the temperature drops from one where the glass is hot enough to flow freely, to one where it is sufficiently viscous for working.

Figure 9:
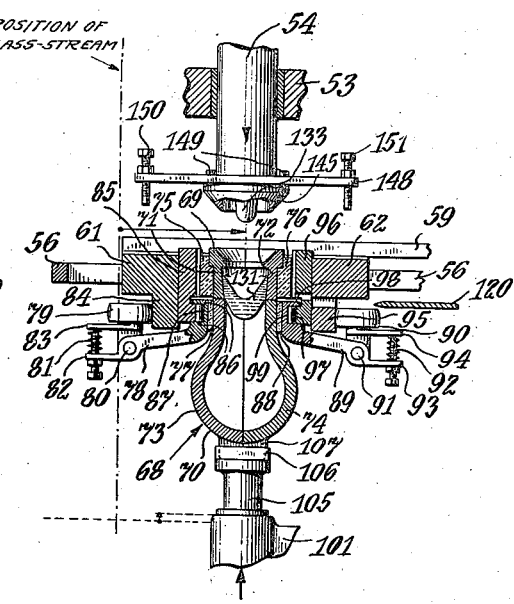
Fig. 9 is a view corresponding to Fig. 8, but showing relative positions of the parts when the mold has reached the location designated by the reference character III in Fig. 3.

A further inward movement of the mold carrier 56, as it revolves from position II to position III, carries the mold 68 so that it underlies its plunger 133 and overlies and interlockingly engages with the oscillating head 105, as shown most clearly in Fig. 9. The engagement with the oscillating head accomplishes two purposes, first, upward movement of the head, by action of the cam 116, raises the lower mold sections 73 and 74 into engagement with the upper mold sections 71 and 72, and second, provision is made for rocking or oscillating the head and lower portions of the associated mold, by means of the corresponding arm 112 and roller 113 which travels in cam track 114, to prevent formation of seams during the subsequent blowing operation.

As the mold revolves further, it reaches the position designated by IV in Fig. 3 and shown in detail in Fig. 10. In this position, the plunger casing and plunger, which were in registry with the mold in Fig. 9, have now been lowered so that the bevelled end portion 145 of said casing fits in the bevelled upper end portions of the upper mold sections 71 and 72, thereby insuring accurate centering and preventing air from escaping while blowing the bulb, and, at the same time, the plunger 133 is depressed to partially form the mass of glass 131 by extending it downwardly into the lower portion 70 of the mold, as illustrated, after which it immediately starts to withdraw.

Figure 11:
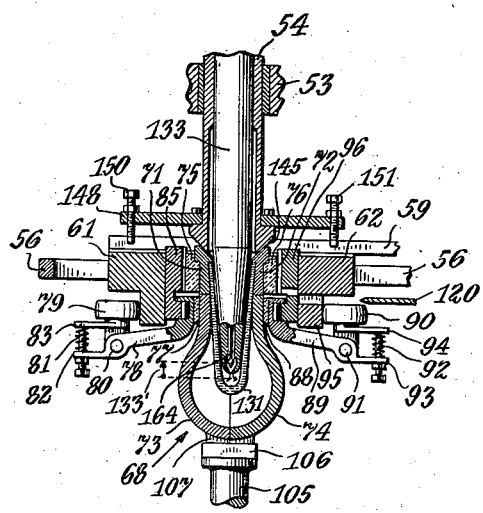
Fig. 11 is a view corresponding to Fig. 8, but showing the relative positions of the parts when the mold has reached the location designated by the reference character V in Fig. 3, the plunger having been slightly withdrawn and compressed air admitted to expand the glass in the mold.

When the mold reaches the position, designated as V in Fig. 3, the plunger has been withdrawn a distance designated by the arrow 133' and the valve 167 opened, allowing compressed air to start expansion of the mass of glass 131, as shown in Fig. 11. This blowing operation continues from position V to position VI, and at the end of the period the glass article is fully distended in the mold, as shown in Fig. 12. During the blowing period, the plunger stays in the position represented in Figs. 11 and 12, the lower portion of the mold being oscillated by the rocking movement of the head, due to the action of the cam 114 on the roller 113, thereby preventing the formation of seams and avoiding any possibility that the glass article will stick to said mold.

When the mold reaches the position VII, as shown in Fig. 3, the cam 66 has operated on the roller 64 and caused the mold portions 71 and 73 to be separated from those designated 72 and 74, as shown in detail in Fig. 13, while at the same time the plunger casing 54 moves downwardly, depressing the sliding elements 85 and 96 to lower the mold portions 73 and 74, and provide a space between them and the upper mold sections 71 and 72 to allow for a return of the sliding plate 120. The opening of the mold allows the glass article 194 to drop therefrom and slide from the machine as along a suitable chute 195 from which it is discharged from the machine. The head 105, at this point, has been dropped by the action of cam 116, to provide the necessary clearance for the chute 195.

Further movement of the mold brings it while open to suitable means, such as a water spray, not shown, for cooling and wetting, and it then moves outwardly to position I, where its sections have been moved together by the action of the cam 66, and the sliding plate 120 returned to the position shown in Fig. 6 providing, with the upper mold sections 71 and 72, a pocket for receiving another mass of glass 131 to be blown into a bulb or other article, in accordance with the shape of the mold.

Embodiment of Fig. 21 and operation

In the embodiment of Fig. 21, the arrangement of the parts may be as in the preceding embodiment, except that the mold 68a is moved inwardly from the glass filling position I, of Fig. 3, to the glass blowing position V (while the plate separating the upper sections of said mold is withdrawn and the plunger brought downward to blowing position) by swinging the mold carrier and mold, as well as the rocking head 105a upwarly from the position shown in dotted lines in Fig. 21, to that shown in full lines, as by means of a cam 196 acting on a roller 197 carried by the arm 101a pivoted as at 102a, to the mold carrier spider or revolving table portion 36a.

The foregoing description of the operation of the first embodiment will, it is believed, show how the embodiment of Fig. 21 is operated for performing glass-blowing operations. As in said first embodiment, the upper portion of the mold 68a is first filled by the stream of glass 172a issuing from a furnace (not shown), said glass initially resting on a sliding separator plate, corresponding with that designated 120 in the first embodiment. Roller 176a, or other glass stream switching means, associated and moving with the mold 68a under consideration, although it may be carried by another spider (not shown), serves for cutting off the glass stream by passing thereunder, after it reaches a position corresponding to position I in Fig. 3.

After the glass stream has been cut off, the sliding plate is withdrawn, as by means corresponding with those of the first embodiment, and the spider 36a carries said mold from a position corresponding with that designated as I in Fig. 3 to one corresponding with that designated as III, while the switching means 176a has been withdrawn, as by movement to the position 176b or 176c, the associated parts being then disposed as illustrated in Fig. 9, except that the mold carrier 56a and associated mold 68a are tipped to a position intermediate those shown in dotted and full lines in Fig. 21. During this movement, the mold is moved inwardly, as compared with the glass stream, by raising the arm 101a and correspondingly tilting the mold and mold carrier, rather than by an inward radial movement without tilting.

Cut off of the glass, however, may be effected, for simplicity as distinguished from the first embodiment, without a change in the angular movements of the mold carriers, equivalent to that shown in Fig. 3. The rollers 176a are then correspondingly larger and effect the cut-off before the mold tilting. The plunger housings 54a may be normally disposed in inclined positions and need have no axial movement, as the swinging movement of the mold carrier 56a may bring about the engagement of said housing with the upper portion of the mold. Of course the plungers 133a necessarily have some movement in the housings 54a, corresponding with the relative movement between the plungers 133 and their housings 54, as in the preceding embodiment, which movement is desirably effected by cam action as in the first embodiment.

A further movement of the mold carrier 56a carries the mold 68a to a position corresponding to V in Fig. 3, the relation of the parts being there represented in full lines in Fig. 21, the valve in the plunger 133a having started to open, as represented in Fig. 11, so that compressed air is being admitted to blow the glass article in the mold. This blowing operation, as in the preceding embodiment, continues during movement of the parts, while tilted in the position shown in full lines in Fig. 21, through an arc corresponding with the movement between positions V and VI in Fig. 3.

At the end of this period, the mold sections are laterally separated to allow the glass article to drop therefrom into a chute (not shown), and the lower portions of the mold separated from the upper portions, as by engagement of set screws 150a and 151a, carried by the housing 54a, with sliding elements of the mold carrier, corresponding with those designated 85 and 96 in the preceding embodiment. Complete release of the glass article does not occur, however, due to the position of the head 105a, until the mold carrier and mold have dropped back to the dotted position of Fig. 21, and the head 105a further retracted to allow the glass article to drop therefrom.

Suitable mold-moistening means (not shown) is desirably provided, and the features not disclosed are preferably in accordance with the preceding embodiment.

Embodiment of Figs. 22 to 25, inclusive, and operation

In the embodiment of Figs. 1 to 20, inclusive, the glass stream 172 was transferred from one mold to the next by means of switch rollers 176, illustrated particularly in Figs. 1, 6, and 15 to 20, inclusive. In Figs. 22 to 25, inclusive, there is a modification shown, corresponding in line of view with Figs. 17, 18, and 19, in which a cutting roller 199 is used with switch rollers I and II, corresponding with rollers 176, in order to avoid the formation of glass "strings." The cutting roller 199 extends laterally from the upper arm of a lever 200, pivotally mounted, as indicated at 201, beyond or outside of the circumferential path along which the switch rollers move, and held in normal position, as shown in Fig. 22, by a spring 202 acting between the lower arm 203 thereof, and a support 204 which is stationary and disposed outside of the operating path of the machine, so as to provide the necessary clearance.

The lever 200 is adjustably held in position by means of a set screw 205 threadably engaging a portion 206 of said cutting roller support 204, a lock nut 207 being desirably provided for holding the set screw 205 in adjusted position. The inner end of said screw 205 engages an abutment portion 208 of the lever 200 in order to normally maintain it in the desired normal position.

The machine operates as described in connection with the embodiment of Figs. 1 to 20 inclusive, except that in the present embodiment the roller 199 lies close to the glass stream 172b so that after the switch roller II engages said stream, it immediately thereafter engages the roller 199 which effects complete severing of said stream, thereby avoiding the formation of a string.

The steps of the operation are sequentially shown in Figs. 22 to 25, inclusive. Fig. 22 shows the position in which the roller 176b, in position I or on the left, has passed beyond the cutting roller 199 and the switch roller 176b, in position II or on the right, is approaching the glass stream 172b which is flowing to a mold 68b in position "A," as in Fig. 17. Fig. 23 shows the next position in which the roller in position II is on the verge of severing the glass stream 172b.

Fig. 24 shows the next position, about as in Fig. 18, in which the glass stream has actually been severed by the roller, in position II, starting to pass thereunder and engaging the roller 199 which serves to complete the cutting of said stream 172b.

Fig. 25 shows the next position, corresponding to Fig. 19, in which the stream has actually been transferred from a mold in position "A" to the next in position "B," as in Fig. 19. The switch roller in position II is here passing the cutting roller 199 by overriding and causing it to rotate about its pivot 201, against the action of the spring 202. After the roller in position II has passed the roller 199, the spring 202 returns the lever 200 and its associated roller 199 to the position shown in Fig. 22.

The parts not shown are desirably in accordance with the embodiment of Figs. 1 to 20, inclusive, or that of Fig. 21.

*Embodiment of Figs. 26 to 30, inclusive, and operation*

In Fig. 6 of the first embodiment, there is shown a nozzle or tip 191 for blowing away the stream of glass 172 by means of compressed air. This nozzle may be used as an alternative to the switch rollers 176 for the removal of the glass stream between molds, thereby avoiding the necessity of any such rollers, or other means for transferring the glass stream from one mold to the next.

In the embodiment of Figs. 26 to 30, inclusive, we have shown such a modification, the operation of which involves the blowing of the glass stream 172c away by means of a jet of air 190c from nozzle 191c, until the associated mold 68c is positioned therebelow for the reception of glass from said stream. The air jet is desirably controlled by a valve alternately opened and closed by a series of lower and upper cams moving with the molds and sequentially engaging lower and upper arms on said valve, as will now be described in detail.

Fig. 26 shows the condition in which the glass stream is blown away, as by operation of a lower cam 209 on the lower valve arm 210, to open the air control valve 211. Fig. 27 shows what happens when the air jet 16 is cut off, as by operation of the upper cam 212 on the upper valve arm 213, to close the valve 211, and allow the stream of glass 172c to flow into the mold 68c. In Fig. 27 there is shown the glass string 214 which is formed when the stream of glass 172c is released to flow into the mold 68c in position "A."

Fig. 28 shows the next position in which the mold 68c has been filled with glass and the nozzle 191c again operated as by engagement of the lower valve arm 210 by the next lower cam 209a to blow a stream of air 190c and remove the glass stream 172c to discontinue filling the mold 68c in position "A." In the process of removing the glass stream 172c from the mold 68c, another glass string, designated as 215, is formed.

Figs. 29 and 30 show, from different angles, a scraper type string cutter 216 which may be made of two pieces 217 of spring steel .02" thick, held in place by a stiffening piece of steel 218, attached to a stationary part of the machine to serve as a support, and separated by a sheet of asbestos 219, in order to better preserve the resiliency of the combination. The parts may be held together by means of rivets or bolts (not shown), and so positioned that, after the glass stream 172c has been removed from the mold, as in Fig. 28, said mold slides thereunder, and the cutter 216 thereupon severs the strings 214 and 215, from the mold in position "A," as shown, leaving the mold free for the insertion of the plunger for the subsequent bulb-blowing operation, in accordance with the description of the first embodiment. These figures also show the next upper cam 212a, getting ready to close the valve 211 for filling the next mold in position "B," and the next lower cam 209b in place for subsequent use.

The parts not shown are desirably as in Figs. 1 to 20, inclusive, or Fig. 21.

*Embodiment of Figs. 31, 32, and 33, and operation*

In the embodiment of Figs. 31, 32, and 33, we have shown molds, the upper portions of which have extensions 220, terminating in cutting edges 221, which serve for transferring the associated glass stream 172d from one mold to the next.

Fig. 31 shows the "A" position in which mold 68d is being filled by the glass stream 172d, the next mold 68d, or one in position "B," being shown on the right. Fig. 32 shows the relation of the parts when two adjacent molds 68d have reached the position represented by "A" and "B" in Fig. 20; that is, where they have more closely approached one another so that the glass switching portion 220 of the mold in position "B" is about to pass under the glass stream 172d and divert it from the "A" position mold into said "B" position mold.

Fig. 33 shows the next position in which the transfer of the glass stream has actually been accomplished, the glass flow practically terminating with respect to the "A" position mold 68d, and starting to flow into the "B" position mold 68d, down the inclined portion of the diverting means 220. This figure also shows the preferred use of a scraper type cutter 216d, like the cutter 216 of Figs. 26 to 30, inclusive, for removing the string 214d. Although each means 220 is shown integral with one-half 72d of the upper part 69d of the respective mold 68, it will be understood that it may be separate, if desired.

*General remarks*

In view of the foregoing disclosure, it will be seen that we have provided an improved method and apparatus for molding glass articles. By means of our invention it is possible to accurately manufacture such articles because of the provision for measuring the amount of glass that is introduced into the mold. It is possible to accurately measure the glass introduced into the mold, because the flowing of glass in the stream 172 is controlled by means of the radiation pyrometer, and the length of the stream which forms the mass of glass 131 to be blown into the finished article, is accurately cut off by means of the corresponding switch roller 176, or other means such as disclosed.

Not only is the amount of glass blown exactly determined by the process and apparatus of the invention, but this is done without waste, except in the embodiment of Figs. 26 to 30, inclusive, as, instead of blowing away or otherwise wasting the glass between filling times, said glass may be carried by the corresponding roller 176 and deposited in the next mold, the operation being so quick that the glass does not have time to solidify on the roller nor is there time for any substantial amount of glass to accumulate thereon before it is transferred to the next mold.

On account of the manner in which the glass articles are formed, it is possible to operate the machine at a high speed, a machine such as shown in the first embodiment, for example, being operable with the mold spider 36 running from 6 to 8 revolutions per minute, thus making it possible to manufacture 512 articles per minute.

Although we have shown our apparatus particularly adapted for the manufacture of bulbs suitable for incandescent electric lamps, it is obvious that we do not wish to be limited to this showing, as merely changing the form of the molds makes it possible to manufacture other kinds of glass articles. It will also be understood that we are not limited to the use of any special kind of glass although, of course, the kind of glass will determine the temperature at which the glass furnace is operated.

To briefly summarize or enumerate the steps of one embodiment of the method of blowing glass articles which we have disclosed, it is stated that said method involves the following:

1. Fill the top portion of a mold above a supporting separator with a measured quantity of glass so hot that it flows freely.
2. Allow the glass in said mold to cool to working consistency.
3. Remove the separator.
4. Bring the mold bottom to join the top.
5. Introduce a forming plunger into the mass of glass as it sags toward the bottom portion of the mold.
6. Immediately withdraw the plunger slightly and at the same time introduce compressed air to blow the glass in the mold.
7. Oscillate the mold bottom during the blowing operation, in order to prevent sticking and the formation of seams.
8. Laterally separate the halves of the upper end lower mold portions to allow the finished glass article to drop therefrom.
9. Moisten the mold in preparation for the next molding operation.

Although preferred embodiments of our invention have been disclosed, it will be understood that other modifications may be made within the spirit and scope of the appended claims, and that the machine is capable of close adjustment by changing one or more of the following factors: (1) the size of the die 174; (2) the temperature and composition of the glass, and (3) the speed of rotation of the machine, so that the volume of glass deposited in each mold corresponds with the cubic content of the glass forming the article being molded, without appreciable excess or deficiency.

We claim:

1. The method of forming glass articles comprising introducing a quantity of molten glass into the top portion of a mold, forcing a plunger into said glass to push it into the bottom portion of said mold and blowing said glass therein by means of compressed air while simultaneously oscillating the bottom portion of said mold to prevent sticking of the glass thereto.

2. The method of forming glass articles comprising moving a series of molds in a normally circular path, causing each mold as it reaches a certain position to deviate from said circular path and hesitate beneath a stream of continuously flowing glass while its upper section is being filled to the desired extent, causing the flow of said stream into said mold to terminate, initially supporting the mass of glass received in each mold on means disposed between the upper and lower sections thereof, withdrawing said means and moving the lower section of said mold to engage said upper section, allowing said glass to sag into said lower section, forcing means into the mass of glass to partially form the article, and introducing compressed air from said means to distend the mass of glass in said mold.

3. The method of forming glass articles comprising rotating means carrying a series of molds disposed along its circumference, each mold being separable into upper and lower sections, causing each mold as it reaches a certain position to hesitate beneath a stream of continuously flowing glass while its upper section is being filled to the desired extent, causing each mold to pass beneath means to transfer the stream of glass therefrom to the next succeeding mold, while the first mentioned mold moves onward, initially supporting the mass of glass received in each mold on means disposed between the upper and lower sections thereof, withdrawing said means and moving the lower section of said mold to engage said upper section, allowing said glass to sag into said lower section, forcing means into the mass of glass to partially form the article, and introducing compressed air from said means to distend the mass of glass in said mold.

4. The method of forming glass articles comprising rotating a series of molds so that each passes beneath a continuously flowing stream of molten glass, causing each mold as it reaches said stream to hesitate while being filled to the desired extent, causing a roller to pass above each mold after it is filled to transfer the stream of glass therefrom to the next succeeding mold, while the first mold moves onward, and engaging the stream on the transfer roller by means for completely cutting said stream, to avoid the formation of a string.

5. The method of forming glass articles comprising moving a series of molds beneath a continuously flowing stream of molten glass, causing each mold to remain beneath said stream long enough to receive a desired charge of glass, severing the charge of glass in the mold from the stream by blowing the stream away from the mold by applying a jet of compressed air to the stream, and causing said mold to pass beneath a scraper device to remove strings.

6. The method of forming glass articles comprising rotating a series of molds beneath a continuously flowing stream of molten glass, each mold having a glass switching portion extending therefrom toward the preceding mold, causing each mold to remain beneath said stream long enough to receive the desired charge, and causing the next succeeding mold to advance so that its glass switching portion interrupts said stream of glass and causes the latter to be deflected into said next mold.

7. The method of forming glass articles comprising rotating a series of molds beneath a continuously flowing stream of molten glass, each mold having a glass switching portion extending therefrom toward the preceding mold, causing each mold to remain beneath said stream long enough to receive the desired charge, causing the next succeeding mold to advance so that its glass switching portion interrupts said stream of glass into the mold being filled before it passes from beneath said stream, and causes the latter to be deflected into said next mold, and scraping the string from said switching portion.

8. Apparatus for forming glass articles comprising a rotatable spider, a series of mold carriers supported by said spider and rotatably and radially movable with respect thereto, a mold secured to each carrier and divided horizontally and vertically into upper and lower side sections, cam means for moving each carrier and opening and closing the side sections of each mold, a rotatable plate carrying a plunger and plunger housing for each mold, cam means for moving each plunger and housing, independently of one another, axially toward and away from their mold, an air valve in each plunger, cam means for opening and closing each valve to supply air to a mass of glass in a mold, means carried by said housing for depressing the lower sections of its mold, means slidable between each pair of upper and lower mold sections to support a mass of glass in the upper section, and means for removing said slidable means to allow said glass to sag into the lower section of said mold prior to introduction of the plunger thereinto and the blowing of the glass article.

9. Apparatus for forming glass articles comprising a rotable spider, a series of mold carriers supported by said spider and movable with respect thereto, a mold secured to each carrier and divided horizontally and vertically into upper and lower side sections, cam means for moving said carrier and opening and closing the side sections of said mold, a rotable plate carrying a plunger and plunger housing for each mold, cam means for moving each mold into engagement with its plunger housing, cam means for moving said plunger axially toward and away from its mold, an air valve in said plunger, cam means for opening and closing said valve to supply air to a mass of glass in said mold, means carried by said housing for depressing the lower sections of said mold, means slidable between said upper and lower mold sections to support a mass of glass in said upper sections, and means for removing said slidable means to allow said glass to sag into the lower section of said mold prior to introduction of the plunger thereinto and the blowing of the glass article.

10. Apparatus for forming glass articles comprising a rotatable mold-carrying spider, a series of mold carriers supported by said spider and rotatably and radially movable with respect thereto, a mold secured to each carrier and divided horizontally and vertically into upper and lower side sections, a glass melting furnace from which a stream of molten glass continually flows into the molds as they move therebeneath, cam means for causing each mold, as it reaches a certain position, to advance outward radially and hesitate beneath said stream of glass, while its upper sections are being filled to the desired extent, means for terminating the flow of said stream into said mold while it rotates with said spider to make way for the reception of said stream by the next succeeding mold, separator means disposed between the upper and lower sections of each mold for initially supporting the charge of glass therein, means for withdrawing each separator and moving the lower sections of each mold to engage the upper sections, after filling the latter, in order to allow the glass to sag into said lower sections, a plunger, means for forcing said plunger into a mass of glass in each mold to partially form the desired article, means for introducing compressed air from said plunger to distend the mass of glass in the mold, and means for laterally separating the side sections of said mold to allow said article to drop therefrom.

11. Apparatus for forming glass articles comprising a rotatable mold-carrying spider, a series of mold carriers supported by said spider and rotatably and radially movable with respect thereto, a mold secured to each carrier and divided horizontally and vertically into upper and lower side sections, a glass melting furnace from which a stream of molten glass continually flows into the molds as they move therebeneath, cam means for causing each mold, as it reaches a certain position, to advance outward radially and hesitate beneath said stream of glass, while its upper sections are being filled to the desired extent, a switch roller for transferring the stream of glass from the mold filled to that following, separator means disposed between the upper and lower sections of each mold for initially supporting the charge of glass therein, means for withdrawing each separator and moving the lower sections of each mold to engage the upper sections, after filling the latter, in order to allow the glass to sag into said lower sections, a plunger, means for forcing said plunger into a mass of glass in each mold to partially form the desired article, means for introducing compressed air from said plunger to distend the mass of glass in the mold, and means for laterally separating the side sections of each mold to allow said article to drop therefrom.

12. The method of forming glass articles, comprising moving a series of molds so that each passes beneath a continuously flowing stream of molten glass, and causing a roller to pass above each mold after it is filled to transfer the stream of glass therefrom to the next succeeding mold while the first mold moves onward.

13. The method of forming glass articles, comprising moving a series of molds so that each passes beneath a continuously flowing stream of molten glass, causing a roller to pass above each mold after it is filled to transfer the stream of glass therefrom to the next succeeding mold while the first mold moves onward, and causing means to cooperate with said roller to avoid the formation of a string.

14. The method of forming glass articles, comprising moving a series of molds so that each passes beneath a continuously flowing stream of molten glass, causing each mold as it reaches said stream to decrease speed while being filled to the desired extent, and causing means to act above each mold after it is filled to effect a transfer of the stream of glass therefrom to the next succeeding mold, while the first mold speeds up and moves onward.

15. Apparatus for forming glass articles, comprising an upper mold section, a lower mold section, means supporting said sections in alignment, automatic means for moving said sections from and into engagement with one another, a plunger movable from a position above the upper section to a position where it passes through said upper section into said lower section, and means for admitting air from the lower end portion of said plunger to distend molten glass in said lower section.

16. Apparatus for forming glass articles, comprising a series of molds, means for moving said molds in a circular path, a stream of molten glass associated with said apparatus, and means for causing each mold, as it approaches said stream of glass, to move outside of said path and hesitate beneath said stream while being filled to the desired extent, and then speed up and move back into said path to make way for the next mold.

17. Apparatus for forming glass articles, comprising a series of mold carriers revolvable about an axis and radially movable, a mold secured to each carrier and divided horizontally into upper and lower sections, each of which sections is divided into side sections, means for moving each carrier and opening and closing the side sections of said mold, rotatable means carrying a plunger and plunger housing for each mold, means for moving each plunger and housing, independently of one another, axially toward and away from its mold, an air valve in each plunger, means for opening and closing each valve to supply air to a mass of glass in a mold, means carried by each housing for depressing the lower section of its mold, means slidable between each pair of upper and lower sections to support a mass of glass above said lower section, and means for moving each slidable means out of the way to allow said glass to sag into the lower section of said mold, prior to axial movement and introduction of a plunger thereinto and the blowing of a glass article by air passing through said plunger.

18. Apparatus for forming glass articles comprising a mold consisting of upper and lower sections, a separator plate for said sections, means for moving said separator plate to and from position between said sections, means for introducing a stream of molten glass into the upper section of said mold, means for terminating the flow of glass into said upper section, a plunger movable through the upper and into the lower section of said mold to act on molten glass therein, after the separator plate has been removed, and the glass has sagged toward said lower section, and means for introducing air into the said glass acted on by said plunger to distend it in said mold.

19. Apparatus for blowing thin glass articles, such as bulbs for electric lamps, comprising a mold consisting of upper and lower sections, means for feeding a measured quantity of freely-flowing molten glass to said upper section, means for holding said glass in said upper section until it has cooled to working consistency, means for then releasing the glass to allow it to sag into the lower section, and means for introducing gas into said sagging glass to blow it to finished form in said mold.

20. The method of forming glass articles, comprising moving a series of molds so that each passes beneath a continuously flowing stream of molten glass, each mold comprising an upper section and a lower section, causing each mold as it reaches said stream to decrease speed therebeneath while being filled to the desired extent, initially supporting the mass of glass received in each mold on means movable between said sections, causing means to act above each mold after it is filled to effect a transfer of the stream of glass therefrom to the next succeeding mold, while the first-mentioned mold speeds up and moves onward, withdrawing said movable means and allowing said received glass to sag into said lower section, and forcing means into said sagging glass to distend it in said mold.

21. The method of forming glass articles, comprising moving a series of molds, each of which comprises an upper section and a lower section, in a predetermined path, causing each mold as it reaches a certain position to deviate from said path, and pass and decrease speed beneath a continuously flowing stream of molten glass, while its upper section is being filled to the desired extent, initially supporting the mass of glass received in each mold on means disposed between said upper and lower sections, causing by means acting above each mold after it is filled, the flow of said stream into said mold to terminate and be transferred to the next succeeding mold, while the first-mentioned mold speeds up and moves onward, withdrawing said supporting means and allowing the glass to sag into said lower section, forcing means into the mass of glass to partially form the article, and introducing compressed air from said means to distend the glass in said mold.

22. Apparatus for forming glass articles, comprising a series of mold carriers movable in a predetermined path, a mold secured to each carrier and involving an upper mold section and a lower mold section, means supporting said sections in alignment, automatic means for moving said sections from and into engagement with one another, each of said sections being divided into side sections, means for moving each carrier and opening and closing the side sections of its mold, a plunger for each mold, an air valve in the lower end portion of each plunger, a compressed air connection to each plunger, means for depressing the lower section of each mold, means slidable between each pair of upper and lower sections to support a mass of heat-softened glass above the lower mold section, means for moving each slidable means out of the way to allow such glass, when in the upper section, to sag into the lower section of its mold, and means for thereupon moving the mold plunger from a position above the upper section of its mold to a position where it passes through said upper section into the lower mold section, and opening its valve to blow a glass article in said mold.

23. Apparatus for blowing thin glass articles, such as bulbs for electric lamps, comprising a series of molds, each mold consisting of upper and lower sections, means for moving said molds in a predetermined path, a stream of freely-flowing molten glass associated with said molds, means for causing the upper section of each mold to receive in succession a measured quantity of glass from said stream, means for holding said glass in the upper section of each mold after so charging, until it has cooled to working consistency, means for then releasing the glass to allow it to sag into the lower section, and means for then introducing gas into said sagging glass to blow it to finished form in said mold.

HENRY K. RICHARDSON.
FRANK A. NEWCOMBE.
ALFRED H. LAIDIG.